Oct. 26, 1971   J. BELART   3,614,911

BRAKE BOOSTER

Filed Oct. 3, 1969   4 Sheets-Sheet 1

Inventor
Juan Belart

Agent

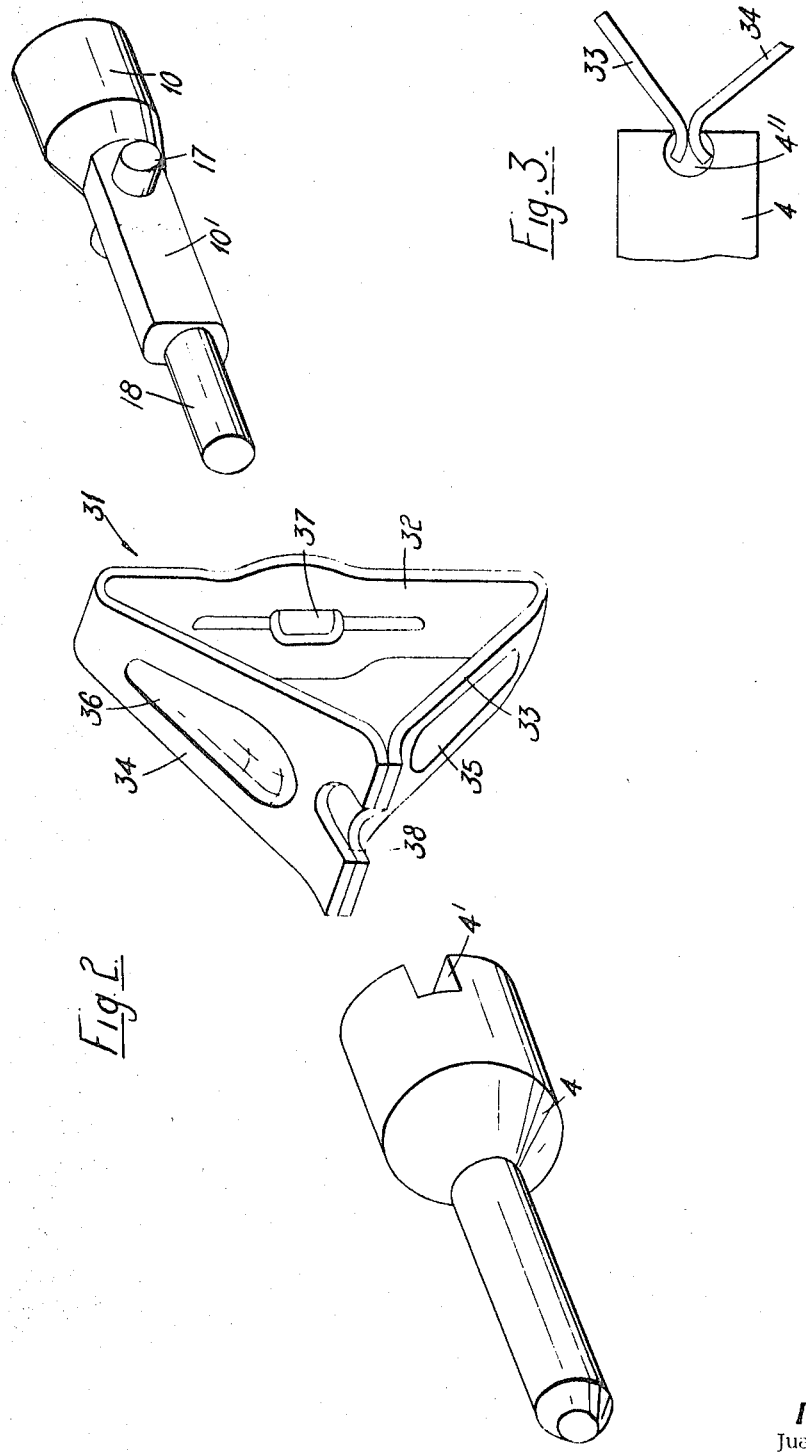

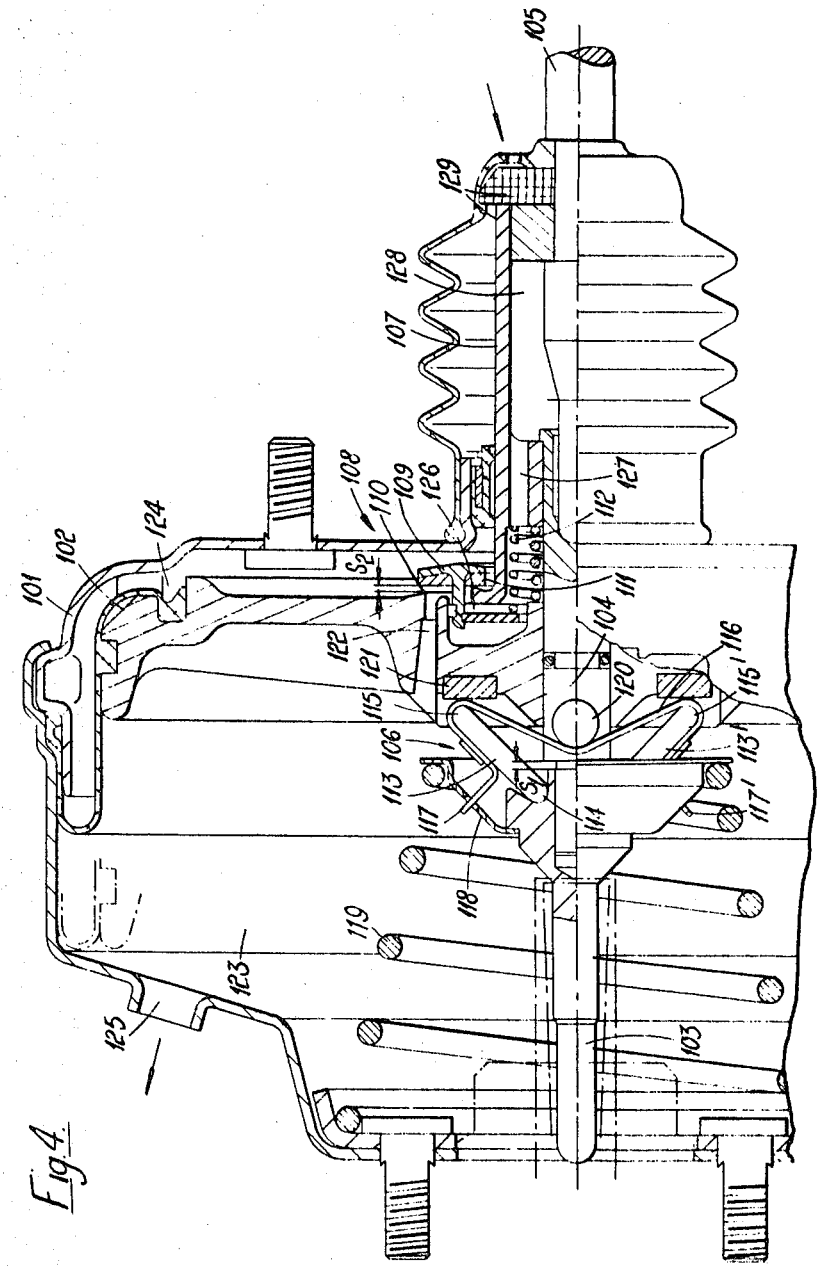

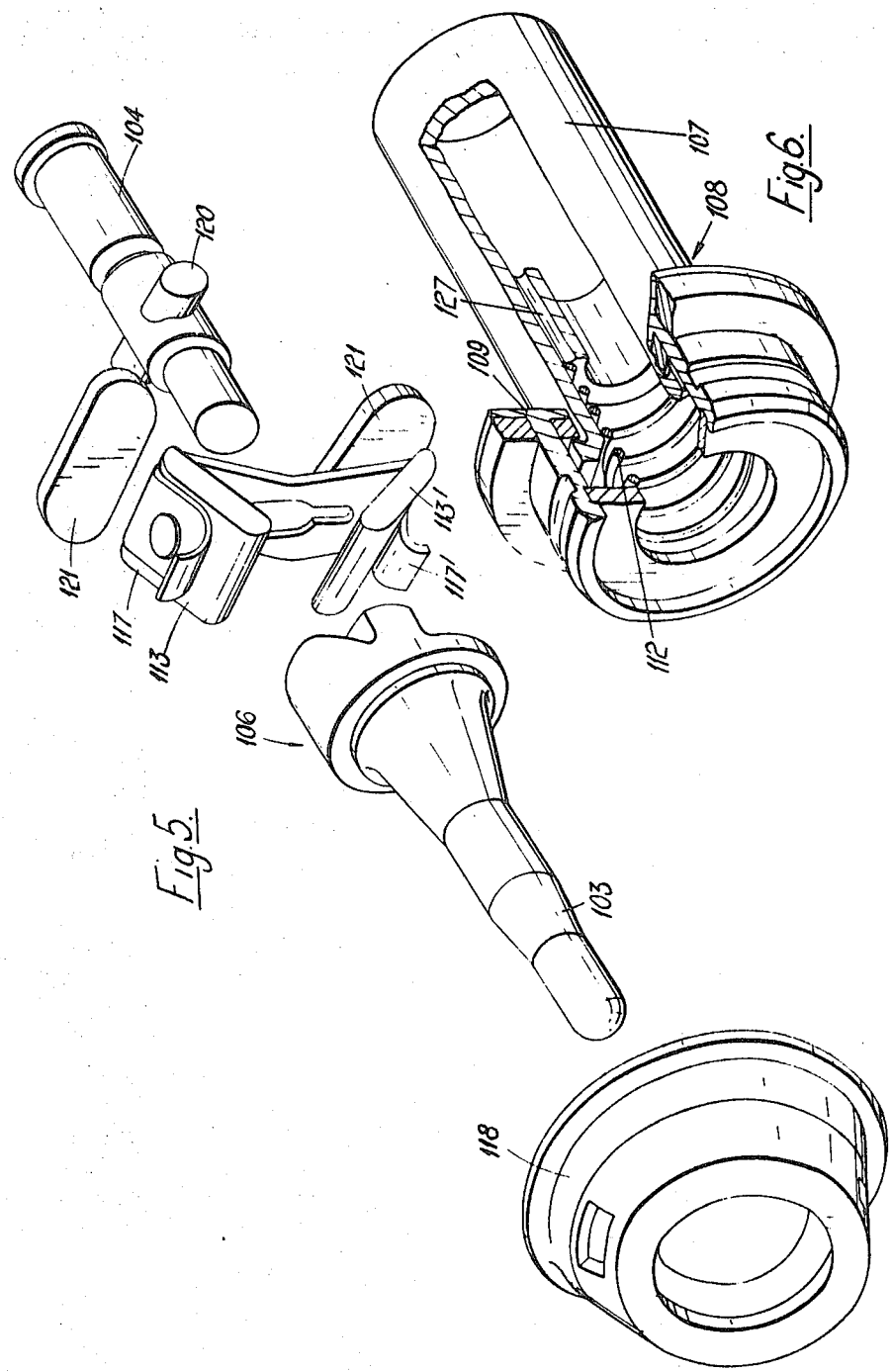

United States Patent Office 3,614,911
Patented Oct. 26, 1971

3,614,911
BRAKE BOOSTER
Juan Belart, Walldorf, Germany, assignor to International Telephone and Telegraph Corporation, New York, N.Y.
Filed Oct. 3, 1969, Ser. No. 863,453
Claims priority, application Germany, Oct. 4, 1968, P 18 01 022.5
Int. Cl. F15b 9/10
U.S. Cl. 91—369 B
15 Claims

ABSTRACT OF THE DISCLOSURE

A vacuum operated brake booster for power assisted brakes in which two thrust members acting between the power piston of the booster and the power transmitting member for the master cylinder are held at an angle with respect to the piston axis by a resilient tie strip connecting the ends of the thrust members. The center section of the tie strip continuously exerts a reaction force on the actuating linkage to eliminate slack in the system.

CROSS REFERENCE TO RELATED APPLICATION

This application is filed under the provisions of 35 USC 119 with a claim for the benefit of the filing date of an application covering the same invention filed on Oct. 4, 1968, Ser. No. P 18 01 022.5 in the Federal Republic of Germany.

BACKGROUND OF THE INVENTION

The invention relates to automobile brake boosters, and particularly automobile brake boosters in which a thrust member transmits braking force from the power piston of the booster to the master cylinder and also transmits a reaction force to the operator and booster control valve.

Automotive brake boosters in which two-armed levers are interposed between the power piston of the booster and the master cylinder are known. One arm of the two-armed levers transmits braking force from the power piston of the booster to the master cylinder while the other arm provides a feedback or reaction force to the booster control valve and operator.

A disadvantage of these boosters is that there is a clearance between the booster control valve and the two-armed lever in the released position which must be overcome during the operation of the valve control member in order to commence the braking action. Since this clearance cannot be exactly regulated there is frequently, at the moment when the brake booster is applied, a residual clearance which is then suddenly overcome so that the power piston is caused to jump. The operator feels this jump as a jerk on the brake pedal whereby the braking effect simultaneously increases beyond the desirable magnitude and momentarily escapes the control of the operator. A further disadvantage of conventional boosters consists in the deflection of the two-armed levers arranged between the power piston and the power transmitting member connected to the master cylinder. When the brakes are applied hard, this deflection may cause a loss of pedal travel which must be compensated for in the booster design.

SUMMARY OF THE INVENTION

It is an object of the present invention to provide an automobile brake booster of the above-mentioned type in which there is no clearance between the booster control element and the reaction member, thereby eliminating uneven application of the brakes due to slack take-up.

This object, and others which will become apparent hereinafter, are attained in accordance with the present invention by a booster in which thrust pieces arranged angularly with respect to each other are provided between the power piston of the booster and the power transmitting member.

The ends of the thrust pieces which act against the power transmitting member meet at a common bearing point on the power transmitting member while the ends acting against the power piston are held at an angle with respect to the center line of the piston by a resilient connecting strip or tie connected to the ends of the pieces. The center section of the connecting strip continuously exerts a reaction force on the booster actuating or control member. The tie connecting the thrust pieces may consist of a flexible band which surrounds the ends of the thrust pieces and is fixed on the longitudinal sides of the thrust pieces. In order to enable a simple assembling of the thrust pieces with the tie, it is proposed that the ends of the flexible band connecting the thrust pieces are bent outwardly from the lateral surfaces of the thrust pieces and gear into corresponding openings of a spring support arranged on the power transmitting member. In this manner the thrust pieces, tie power transmitting member and plate spring may constitute a loosely interconnected unit which can be easily assembled. A simple bearing for the power transmitting member is advantageously achieved if the control member of the valve mechanism is provided with an axial shoulder which passes through an opening in the tie and whose cylindrical end extends into a respective bore in the power transmitting member. For transmission of reaction force from the tie to the control member of the valve mechanism the control member may provide, in accordance with another embodiment of the invention, a pin extending perpendicularly to the axis of the control member and beyond the cross section of the control member to provide a stop which contacts the tie. In order to limit the backward stoke, it is further provided that this pin contacts the power piston in the released position of the brake booster. Alignment of the tie and control member is assured by making the opening in the tie and the part of the control member which extends through the tie in a rectangular or other noncircular shape.

The friction between the thrust pieces and the power member, in particular at high operating powers, is kept low by providing low friction sliding surfaces on the power piston where it contacts the thrust pieces. In the power transmitting member the accommodation of the thrust pieces is advantageously arranged in grooves, the ends of which are part of a cylindrical jacket. This arrangement aims at a large contact surface between the thrust pieces and the powe transmitting member so that the stresses remain low and the use of expensive materials with high strength becomes unnecessary.

According to a further proposal of the invention a simpler manufacture of the lever mechanism is achieved in which the thrust pieces and tie are made in one piece from thin-walled sheet metal with high elasticity with the parts constituting the thrust pieces having longitudinal recesses to provide compressive strength. Advantageously, the tie may be constructed as a plate spring elastic perpendicularly to the direction of stress and may act as a readjusting spring so that the arrangement of further readjusting springs becomes unnecessary.

BRIEF DESCRIPTION OF THE DRAWINGS

FIG. 2 is a perspective view of an embodiment of the lever mechanism of FIG. 1.

FIG. 3 is a perspective view showing a variation in the connection between the lever assembly and the power transmitting member.

FIG. 4 is a sectional view of another embodiment of the invention.

FIG. 5 is a perspective representation of the lever mechanism of FIG. 4.

FIG. 6 is a perspective view of the valve mechanism of FIG. 4.

DESCRIPTION OF THE PREFERRED EMBODIMENTS

Figure 1:
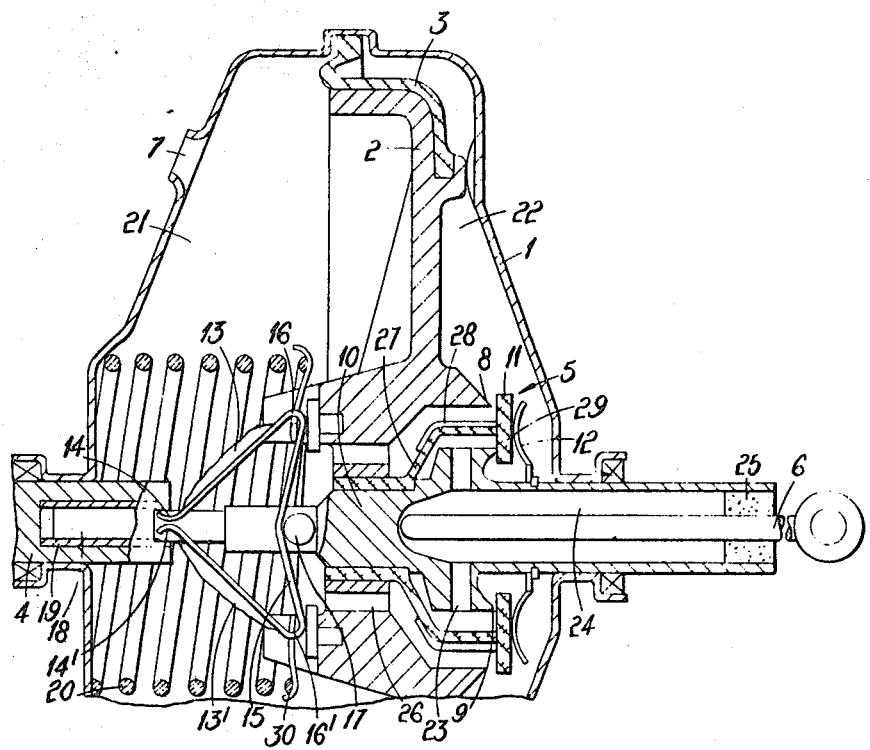
FIG. 1 is a sectional view of an embodiment of the brake booster according to the invention.

The brake booster shown in FIG. 1 comprises the housing 1 and a booster piston 2 arranged to move longitudinally in the housing 1. The booster piston 2 is sealed with respect to the housing wall by means of a diaphragm 3 and is designed to operate the piston of a master cylinder of a hydraulic braking system via the rod 4. The brake booster is controlled by a valve mechanism 5 which is supported by the booster piston 2 and is moved by an actuating rod 6 which juts out at the rear end of the brake booster and may be moved by the brake pedal. The working pressure differential necessary for movement of the booster piston 2 is generated by a vacuum source which is connected to the housing of the brake booster at the opening 7.

The valve mechanism 5 for operation of the brake booster consists of a valve seat surface 8 on the booster piston 2, the valve seat surface 9 on the control element 10 and a valve closing member 11 arranged between the booster piston 2 and the control member 10. The valve closing member 11 is held against one of the two valve seat surfaces by the spring 12.

The valve closing member 11 consists of a diaphragm piece 27 tightly stretched between the booster piston 2 and the control member 10. The diaphragm piece 27 is reinforced by the strut rings 28 and 29.

A lever mechanism is employed for transmission of the actuating power exerted by the booster piston 2 to the rod 4 during the operation of the brake booster. The lever mechanism consists of the thrust pieces 13 and 13', the free ends 14 and 14' of which are held in a groove of the rod 4 and the ends 16 and 16' adjoining the booster piston are interconnected via a tie 15. The tie 15 is supported on the control member 10 of the valve mechanism 5 via a bolt or pint 17 arranged perpendicularly with respect to the axis of the control member. The control member 10 itself penetrates the tie 15 and its cylindrical shoulder 18 is positioned in a bore 19 of the rod 4.

In the rest position, e.g., when the brake has been released, the booster piston 2 is held against the housing 1 by means of the readjusting spring 20 which is supported on a spring plate 30 acting on the lever mechanism. The control member 10 of the lever mechanism 5 is thereby pushed back to the extent that the valve closing member 11 rests only on the valve seat surface 9 and a ring gap between the valve seat surface 8 and the valve closing member 11 is open. The working chambers 21 and 22 on both sides of the booster piston 2 are connected with each other and to a vacuum source via a connection 7 so that both chambers 21 and 22 are brought under vacuum.

Upon actuation of the brake booster the control member 10 is moved with respect to the booster piston 2 by the actuating rod 6 to the extent that the valve closing member 11 is also brought into contact with the valve seat surface 8 so that the working chambers 21 and 22 are separated from one another. Simultaneously, upon operation of the control member 10 the rod 4 is moved together with the piston of the master cylinder. The extent to which the piston of the master cylinder is thereby moved is determined by the valve mechanism and in this embodiment the movement causes the sealing collar of the master cylinder piston to traverse the compensating bore in the master cylinder and thereby build up a small pressure in the master cylinder. Upon further movement of the control member 10 the valve seat surface 9 is lifted from the valve closing member 11 so that the working chamber 22 is connected to atmosphere via the resulting annular gap, the passages 23 and 24 and the air filter 25. The difference in pressure across the booster piston 2 now generates an operating force which acts on the master cylinder piston via the thrust pieces 13 and 13' and the rod 14. The thrust pieces 13 and 13' tend to diverge and stretch the tie 15 so that a reaction force directed against the operating power of the piston 2 is transmitted via the pin 17 to the control member of the valve mechanism and via the actuating rod 6 to the operator.

The ratio between the foot pressure acting at the pedal and the actuating power acting on the rod 4 is in the case determined by the angle between the thrust pieces 13, 13'. Since the angle between the thrust pieces 13, 13' will change only within narrow limits during the whole braking action, the ratio may be regarded as constant. However, it is possible to construct devices with different ratios by changing the angle between the thrust pieces.

In order to release the brake booster it is only necessary to reduce the foot pressure acting on the control member 10 so that the elastic force in the tie 15 moves the control member 10 towards the operator until the valve seat surface 9 is brought into contact with the valve closing member 11 and lifts the latter from the valve seat surface 8 on the power piston. The pressure in the chamber 22 may now be reduced via the passages 26 in the power piston 2 which is again brought back to its initial position by the spring 20.

FIG. 2 shows in perspective an embodiment of the lever mechanism for transmission of the operating power exerted by the power piston 2 to the rod 4 and of a reaction force to the control member 10 of valve mechanism so that the construction of their individual components may be clearly discerned. In this embodiment the lever mechanism consists of a body 31 stamped of thin-walled sheet metal with high elasticity whose media part 32 constitutes the tie and whose lateral parts 33 and 34 are bent towards each other from the plane of the medial part and serve as thrust pieces. In order to increase the column strength of parts 33 and 34 they are provided with longitudinal recesses 35 and 36. The ends of the parts 34 and 35 are bent outwardly so that they flatly adjoin one another and form an essentially square body which is fitted into the slit 4' of the rod 4. The medial part 32 of the sheet metal piece 31 is slit in it longitudinal direction for increasing elasticity and is provided with a rectangular opening 37 into which the likewise rectangular part 10' of the control member 10 fits so that the sheet metal piece 31 is prevented from twisting with respect to the control member 10. In the assembly of the lever mechanism the forward cylindrical part 18 of the control member 10 passes through the groove 38 provided at the ends of the parts 33 and 34 and fits into the supporting bore 19 provided in the rod 4 so that the rod 4 and the control member 10 are operated concentrically with respect to one another.

According to a further proposal of the invention, in order to simplify the assembly of the lever mechanism, the ends of the lateral parts 33 and 34 constituting the thrust pieces, may be bent outward, as shown in FIG. 3, to such an extent that upon contact they form a wedge. For the assembly the body 31 together with its ends is inserted laterally into a groove 4" of the rod 4, the groove tapering towards the rod end so that in axial direction the body 31 is positively connected with the rod 4. A lateral slipping out is prevented by a control member 10 which is inserted afterwards.

The brake booster shown in FIG. 4 is intended for operation of the master cylinder of a hydraulic braking system and consists of a housing 101, the power piston 102 sealed with a rolling diaphragm with respect to the housing, a push rod 103 acting on the master cylinder piston, a lever mechanism 106 transmitting the power of the power piston 102 to the push rod 103 and a reaction force to the brake pedal via a thrust piece 104 and the actuating rod 105, and a valve mechanism 108 operated by a control member 107 connected to the thrust piece 104. The valve mechanism 108 provides an annular valve closing member 109 movable and sealed with respect to the power piston 102. The valve closing member 109 cooperates with the valve seat surfaces 110 and 111 on the power piston 102 or on the control member 107 and is pressed on the valve seat surfaces 110 and 111 by a valve spring 112. The lever mechanism comprises two thrust pieces 113 and 113' of essentially rectangular cross-section. Two ends 114 and 114' of the thrust pieces are pivotedly arranged in respective grooves of the push rod 103, whereas their other ends 115 and 115' are surrounded by a tie 116 connecting the two thrust pieces with one another. The tie 116 is fixed on the outer surfaces of the thrust pieces 113 and 113', whereby their ends 117 and 117' are bent outwardly approximately perpendicularly to the outer surfaces of the thrust pieces and fit into corresponding openings of a spring plate 118 which is arranged on the push rod 103 and is used for the support of the readjusting spring 119. The tie 116 is provided with a medial opening through which the thrust piece 104 passes. The lateral limiting parts of the opening are contiguous with the pin 120 arranged in the thrust piece 104. In order to reduce the sliding friction between the lever mechanism 106 and the power piston 102, the latter is provided with sliders 121 which consist of a material with high compressive strength and good sliding property.

The position shown in FIG. 4 is the rest position of the brake booster. The power piston 102 is brought into contact with the brake housing 101 by means of the readjusting spring 119 and the ever mechanism 106. The thrust piece 104 is supported via the pin 120 on the power piston. The lever mechanism 106 is stretched by the force exerted by the readjusting spring 119. The valve closing member 109 is pressed by the valve spring 112 on the valve seat surface 111 of the control member 107 and thereby an annular gap is kept open on the valve seat surface 110. The annular gap interconnects the two pressure chambers 123 and 124 which are otherwise separated from one another by the power piston. The pressure chamber 123 is connected to a vacuum source via a connection 125 so that there is an equal vacuum in each chamber during operation of the booster.

During operation of the brake booster the control member 107 is first pushed via the actuating rod 105 and the thrust piece 104 so far towards the power piston 102 that the valve closing member 109 comes into contact with the valve seat surface 110 and separates the two pressure chambers 123 and 124 from one another. Simultaneously, the tie 116 is stretched by means of the pin 120 and the thrust pieces 113 and 113' moved towards one another so that the push rod 103 moves towards the master cylinder and builds up a small pressure therein. If the actuating rod 105 is pushed further into the housing 101 of the brake booster, the valve seat surface 111 on the control member 107 is lifted from the valve closing member 109 whereby an annular gap is opened which connects the pressure chamber 121 to the chamber 126 and the chamber 128 via the passages 127 in the control member 107 and the air filter 129 to atmosphere. The vacuum in the chamber 123 is then reduced so that the difference in pressure acting on the power piston 102 exerts on the latter a force which is transmitted via the lever mechanism 106 to the push rod 103 for operation of the master cylinder and as reaction force to the thrust piece 104 for transmitting a braking effect to the actuating rod.

In order to release the brake booster it is merely necessary to decrease the operating force on the brake pedal. The pressure prevailing in the hydraulic working cylinder moves the control member of the valve mechanism via the lever mechanism from the power piston 102 so that the annular gap between the valve seat surface 111 and the valve closing member 109 is closed and the valve closing member 109 is lifted from the valve seat surface 110. Thereby the connection between the pressure chamber 124 and the pressure chamber 123 is established anew so that the pressure prevailing in the pressure chamber 124 can be reduced and the power piston 102 yields to the forces acting on it, generated by the hydraulic pressure in the working cylinder and by the readjusting spring 119, until it comes into contact with the housing 101.

The advantages aimed at by the invention consist particularly in that a constant connection between the operating mechanism and the operator is maintained owing to the construction and arrangement of the lever mechanism transmitting or distributing powers, on the one hand, between the power member and the power transmitting member and, on the other hand, between the power member and the control member. This connection must not be interrupted even for initiating a control action. Hereby a sudden increase in the operating and reaction power is avoided when the brake booster starts functioning. Further, the lever mechanism according to the invention enables a simple construction of the brake booster, whereby individual components may be manufactured economically and the device assembled expeditiously.

It will be appreciated that the invention illustrated and described herein may be modified by those skilled in the art without deviating from the spirit and scope of the invention as set forth in the following claims.

I claim as my invention:

1. A brake booster wherein a valve operable by an operator by means of a control member controls the movement of a power member and wherein said power member moves a power transmitting member, said control member, said power member and said power transmitting member all being disposed along the coaxial of the longitudinal axis of said brake booster, the improvement comprising a pair of thrust members disposed between said power member and said power transmitting member, each of said thrust members having one end thereof engaging said power transmitting member and extending therefrom toward said power member at an angle greater than 0° and less than 90° with respect to said longitudinal axis and a flexible tie interconnecting the other ends of said thrust members, said tie cooperating with said power member to transmit a reaction force to control member.

2. A brake booster as defined in claim 1, wherein the tie is a flexible band which surrounds the ends of the thrust members and is fixed on the longitudinal sides of the thrust members.

3. A brake booster as defined in claim 2, wherein the ends of the flexible band connecting the thrust members are bent outwardly from the lateral surfaces of the thrust members and fits into corresponding openings of a spring arranged on the power transmitting member.

4. A brake booster as defined in claim 3, wherein the control member has an axial extension on one end which passes through an opening in the tie and whose cylindrical end extends into a corresponding bore in the power transmitting member.

5. A brake booster as defined in claim 4, wherein the extension on the end of the control member has a shoulder extending radially beyond the cross-section of the extension and which abuts against the tie to transmit the reaction force from the tie to the control member.

6. A brake booster as defined in claim 5, wherein the opening in the tie and the part of the extension of the control member passing through the tie are both noncircular to prevent relative rotation of the tie and control member.

7. A brake booster as defined in claim 6, wherein the power member is equipped with sliders of a material with good sliding properties on which the thrust members are supported.

8. A brake booster as defined in claim 1, wherein the thrust members and tie are one piece.

9. A brake booster as defined in claim 8, wherein the one-piece tie and thrust members consist of thin-walled sheet metal with the parts forming the thrust members being strengthened by longitudinal ribs.

10. A brake booster as defined in claim 1, wherein the control member has an axial extension on one end which passes through an opening in the tie and whose cylindrical end extends into a corresponding bore in the power transmitting member.

11. A brake booster as defined in claim 10, wherein the extension on the end of the control member has a shoulder extending radially beyond the cross-section of the extension and which abuts against the cross-section of the extension and which abuts against the tie to transmit the reaction force from the tie to the control member.

12. A brake booster as defined in claim 11, wherein the opening in the tie and the part of the extension of the control member passing through the tie are both noncircular to prevent relative rotation of the tie and control member.

13. A brake booster as defined in claim 9, wherein the control member has an axial extension to one which passes through an opening in the tie and whose cylindrical end extends into a corresponding bore in the power transmitting member.

14. A brake booster as defined in claim 13, wherein the extension on the end of the control member has an shoulder extending radially beyond the cross-section of the extension and which abuts against the tie to transmit the reaction force from the tie to the control member.

15. A brake booster as defined in claim 14, wherein the opening in the tie and the part of the extension of the control member passing through the tie are both noncircular to prevent relative rotation of the tie and control member.

References Cited

UNITED STATES PATENTS

| | | | |
|---|---|---|---|
| 3,013,533 | 12/1961 | Brown | 91—369 B |
| 3,209,657 | 10/1965 | Randol | 91—369 B |
| 3,389,642 | 6/1968 | Robinette | 91—369 B |

PAUL E. MASLOUSKY, Primary Examiner

U.S. Cl. X.R.

91—37 C